United States Patent
Izumi

[19]

[11] Patent Number: 5,810,296
[45] Date of Patent: Sep. 22, 1998

[54] INTEGRATED RESTRAINT/RELEASE/ DEPLOYMENT INITIATION DEVICE

[75] Inventor: Michael T. Izumi, Glendale, Calif.

[73] Assignee: TRW Inc., Redondo Beach, Calif.

[21] Appl. No.: 711,714

[22] Filed: Aug. 29, 1996

[51] Int. Cl.[6] .................................................. B64G 1/44
[52] U.S. Cl. ...................... 244/173; 244/158 R; 136/245
[58] Field of Search ............................... 244/158 R, 173; 136/244, 245

[56] References Cited

U.S. PATENT DOCUMENTS

| | | | |
|---|---|---|---|
| 3,677,508 | 7/1972 | Dillard et al. | 244/173 |
| 3,981,467 | 9/1976 | Ludlow | 244/158 R |
| 4,347,023 | 8/1982 | Rizos | 244/173 X |
| 4,419,033 | 12/1983 | Roth et al. | 244/173 X |
| 4,491,289 | 1/1985 | Rinn et al. | 244/158 R |
| 4,491,446 | 1/1985 | Ewald | 244/173 X |
| 5,098,042 | 3/1992 | Viale | 244/173 |
| 5,356,095 | 10/1994 | Aker | 136/245 X |

Primary Examiner—William Grant
Attorney, Agent, or Firm—Michael S. Yatsko

[57] ABSTRACT

An integrated restraint/release/deployment initiation device 40 suitable for use with mechanisms such as solar panel arrays 22 on a space-based support structure such as a satellite 20 is disclosed. The device 40 comprises a releasable restraining mechanism 70, 90, 92 for applying restraining force to a stowed solar panel array to substantially prevent lateral movement of the solar panels 26a–26d relative to each other and to substantially prevent movement of the solar panel array relative to the support structure. The restraining mechanism provides an adjustable pre-load and tilt adjustment for the solar panel array. A non-explosive actuated releasing mechanism 42, 46 is provided to rapidly release the restraining force applied to the stowed solar panel array. The device also comprises a deployment initiation mechanism 82, 84, 88 which applies a biasing force to the solar panel array in response to actuation of the releasing mechanism to urge the solar panel array to the unfolded condition away from the support structure.

30 Claims, 6 Drawing Sheets

INTEGRATED RESTRAINT/RELEASE/DEPLOYMENT INITIATION DEVICE

The present invention was made with U.S. Government support under government contract number NASW-4945. The U.S. Government has rights in the present invention.

BACKGROUND

The present invention is directed to the field of restraint and deployment devices and, more particularly, to an integrated restraint/release/deployment initiation device suitable for use with deployable spacecraft-based mechanisms.

Mechanisms such as solar panel arrays, antennas, deployment booms, support members and the like are commonly carried on spacecrafts for deployment in space to perform special functions. These mechanisms must be securely restrained during launching of the spacecraft while stowed, and through delivery of the satellite into its operating orbit.

The mechanisms are released and deployed on board the spacecraft by actuating one or more restraint devices via remote control. Proper release and deployment of the mechanisms are critical to ensure that they are fully operational for their intended function. As failed deployment is generally not correctable, devices that are relied on for release and deployment functions need to be fail safe for one-time use.

Secure restraint of stowed solar panel arrays is important to prevent movement of the solar panels relative to each other, and relative to the spacecraft. Restraint mechanisms are known that are secured to stowed solar panel arrays to inhibit movement of the solar panels. Known restraint mechanisms include, for example, mating cup and cone type elements and serrated plates attached to adjacent solar panels, typically at the interior of the solar panel arrays. This placement of the restraint mechanisms reduces the number of solar cells that can be fitted on the major faces of the solar panels. In addition, this placement forces other devices such as the release devices to be located away from the restraint mechanisms, preventing a compact construction.

Various types of release devices for releasing restrained solar panel arrays from satellites are known. Known release devices include explosive and non-explosive actuating (NEA) mechanisms. The explosive actuating mechanisms pyrotechnically sever a pin, cable or bolt to release the stowed solar panel array. These mechanisms cause undesirable effects due to the high shock they generate during detention and subsequent strain energy release. The high shock can cause damage to sensitive solar cells and electrical wiring joints on the solar panels, to the satellites, and to the payload inside the satellite. In addition, the high shock can cause skewed release of the solar panel arrays, resulting in the solar panels not being properly deployed and the associated satellite possibly being irreparably crippled.

The non-explosive actuated release mechanisms overcome the problem of high shock generation, but have other specific problems. For example, non-explosive release mechanisms known as thermal knives burn through a tensioned restraining wire or cable to release the solar panel array. Such mechanisms are very slow functioning and require a high power level to operate. As a satellite's power is limited, typically no more than two of these release devices can be actuated simultaneously. These limitations make the thermal knife-type mechanisms incapable of quickly releasing a solar panel array when more than two such release devices are used to secure the solar panel array to the satellite. In fact, the solar panel array release typically requires a total of several minutes to complete. Another problem is that the solar panel array can be released in a skewed manner due to thermal knives severing restraining cables at different locations during significantly different times.

The known release devices can also include separate mechanisms to assist in the initiation of deployment of deployable mechanisms from the stowed position. During the initiation of deployment, it is important that the mechanism be urged away from the spacecraft to allow deployment to occur.

Known devices for restraining, releasing and deployment initiating of deployable mechanisms on spacecrafts are inadequate. The known devices have complex constructions as these three separate functions are commonly performed by separate, spaced devices. As known mechanisms for performing these functions are inadequate, the known devices are unreliable and have an associated high risk of unsatisfactory operation. Such multiple-device constructions are difficult and expensive to manufacture, as well as being difficult and expensive to test as several devices must be separately tested. Furthermore, the known devices are large and heavy due to the separate mechanisms each having their own set of parts and the parts being located at widely spaced positions. Size and weight are of critical importance in spacecrafts to maximize the payload.

Thus, there is a need for a device for restraint, release and deployment initiation of deployable mechanisms such as solar panel arrays, antennas, booms and support members provided on spacecrafts that (i) securely restrains the mechanism to a transport spacecraft from spacecraft stowage, through launch, and to release of the spacecraft boost vehicle; (ii) provides reliable release; (iii) has assistance in deployment initiation of the mechanism from the restrained position on the spacecraft to ensure deployment; (iv) has a simple construction; (v) is easy to manufacture and test; and (vi) has reduced size and weight.

SUMMARY

The invention is directed to an integrated restraint/release/deployment initiation (RRDI) device that satisfies the above needs. More specifically, the invention (i) provides all three of the functions of restraint, release and initiation of deployment in one device; (ii) provides secure restraint of a mechanism on a support structure to substantially prevent lateral shear loads; (iii) Provides rapid, non-explosive actuated release of the mechanism from the stowed condition; (iv) provides deployment initiation of the mechanism away from the support structure in a fail safe, one-time deployment; (v) has a simple, compact, integrated construction comprised of a reduced number of piece parts; and (vi) is easy and inexpensive to test.

The RRDI device according to the present invention is suitable for the restraint, release and deployment initiation of a deployable mechanism, operable between a stowed condition and a deployed condition, mounted on a support structure. The RRDI device comprises a base for mounting to the support structure and for supporting the deployable mechanism in the stowed condition; a releasable restraining mechanism mounted to the base for applying restraining force to the stowed mechanism to substantially prevent movement of the mechanism relative to the support structure; a non-explosive actuated releasing mechanism connected to the restraining mechanism for rapidly releasing the restraining force applied to the stowed mechanism; and a deployment initiation mechanism for applying a biasing force to the deployable mechanism in response to actuation of the releasing mechanism to urge the deployable mechanism to the deployed condition away from the support structure.

The deployable mechanism can be a solar panel array, antenna, boom, support member or the like. The support structure can be land, sea or space-based. Typically, the RRDI device is used on a satellite in combination with solar panel arrays.

The restraining mechanism comprises a plurality of brackets, each attached to a solar panel of the solar panel array. The base and the brackets have serrated surfaces which interlock with one another in the stowed condition to substantially prevent lateral movement of the solar panels relative to each other. The restraining mechanism applies an adjustable, compressive pre-load to the solar panel arrays through the brackets. In addition, the restraining mechanism provides for tilt misalignment adjustment of the stowed solar panel array relative to the support structure.

The deployment initiation mechanism applies a biasing force directly to the solar panel array in response to actuation of the release mechanism to urge the solar panel array to the deployed condition away from the support structure.

The releasing mechanism is preferably a non-explosive separation nut assembly including a releasable separation bolt. The releasing mechanism provides rapid release of the solar panel array and also low shock actuation, making the RRDI device particularly suitable for the release of sensitive, solar panel arrays.

To ensure complete separation of the separation bolt from the separation nut assembly, the device comprises a separation bolt release assist mechanism. In addition, a separation bolt catcher is provided on the restraining mechanism for catching the separation bolt after it is released from the separation bolt assembly, to prevent bounce back of the separation bolt.

In addition, a resilient member is mounted on the releasing mechanism for urging the solar panel array away from the support structure subsequent to actuation of the separation bolt assembly. The resilient member compensates for any lateral movement of the solar panel array that occurs after release.

DRAWINGS

These and other features, aspects and advantages of the present invention will become better understood from the following drawings, description and appended claims, where:

DESCRIPTION

The invention is an integrated restraint/release/deployment initiation (RRDI) device 40. The RRDI device 40 is particularly suitable for use on space-based support structures such as satellites for the restraint, release and deployment initiation of various deployable mechanisms including solar panel arrays, antennas, booms, support members and the like.

Figure 1:
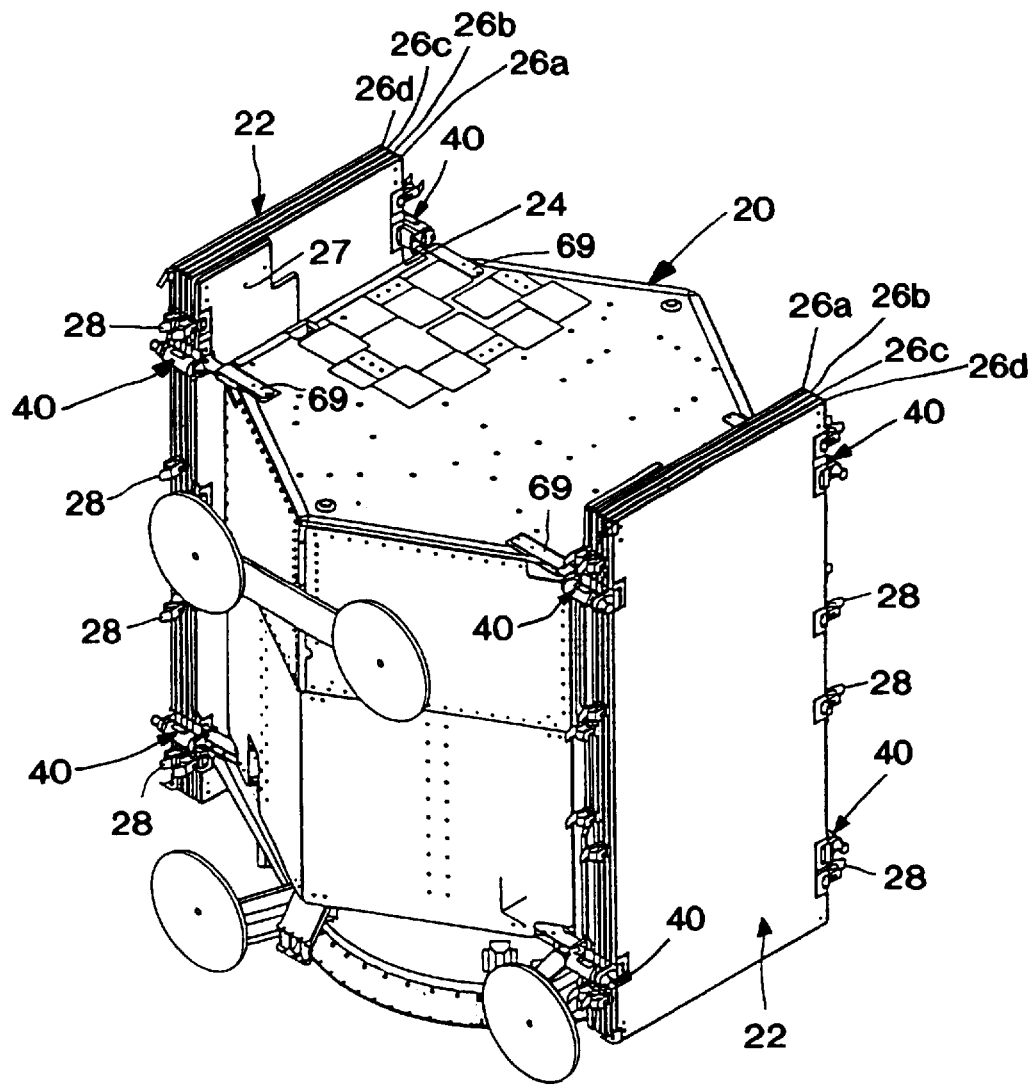
FIG. 1 is a perspective view of a conventional satellite showing the solar panel arrays in the stowed condition and the location of a plurality of restraint/release/deployment initiation (RRDI) devices according to the invention about the perimeter of the solar panel arrays.
Figure 2:
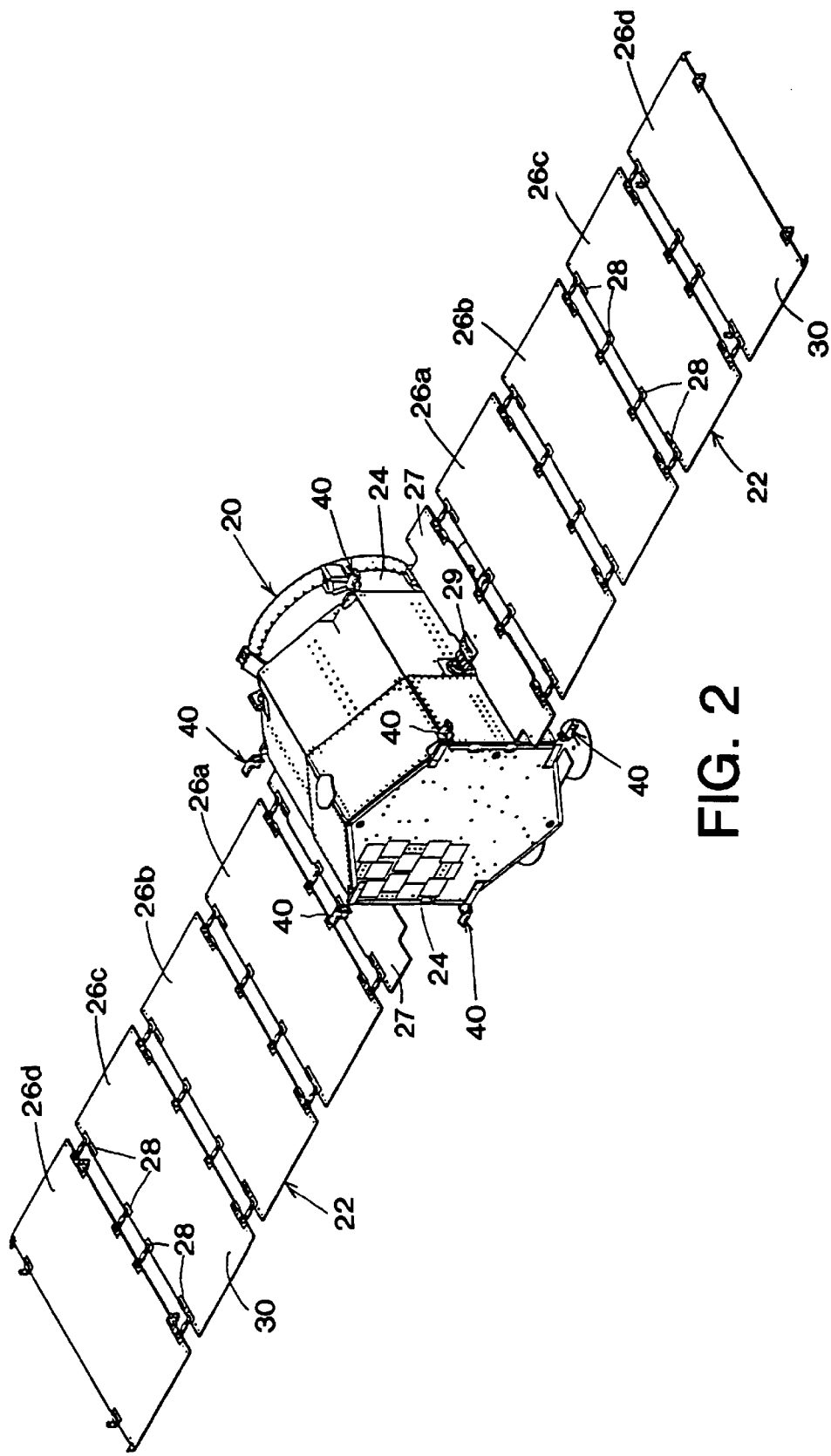
FIG. 2 is a perspective view of the conventional satellite of FIG. 1 showing the solar panel arrays in the deployed condition.

FIGS. 1 and 2 illustrate generally the overall function of the RRDI device 40 on a conventional satellite 20. A pair of solar panel arrays 22 are mounted at opposite sides 24 of the satellite 20. As used herein, the term "solar panel array" refers to solar panel stacks including a plurality of solar panels. In FIG. 1, the solar panel arrays 22 are shown in the restrained (stowed) condition prior to their release and deployment. The solar panel arrays 22 each comprise a plurality of full solar panels 26a–26d, and an inner partial solar panel 27 adjacent to the satellite 20. The partial solar panel 27 is attached to a hinge mechanism 29 on the satellite 20. The number of full solar panels 26a–26d in the solar panel arrays 22 can vary depending, for example, on the size of the solar panels 26a–26d and the desired span of the solar panel arrays 22. In the stowed condition, the solar panels 26a–26d are folded and the major faces 30 of the adjacent solar panels 26a–26d are parallel to each other.

The solar panel arrays 22 are restrained against movement in the stowed condition by a plurality of RRDI devices 40 mounted to the satellite 20 about the perimeter of the solar panel arrays 22. Typically, an RRDI device 40 is mounted proximate to each of the four corners of the solar panel arrays 22 as shown to provide rigid attachment to the satellite 20. The RRDI devices 40 are mounted at hard, load bearing locations about the satellite 20 to support the solar panel arrays 22. The corners of the satellite 20 are typically the most suitable location for mounting the RRDI devices 40. The number of RRDI devices 40 used to secure the solar panel arrays 22 can be varied. For example, six or eight RRDI devices 40 can be used for large and heavy solar panel arrays. Less than four, and as few as one, RRDI device 40 are typically sufficient to restrain smaller and lighter solar panel arrays and mechanisms such as antennas.

The RRDI devices 40 are actuated to release the solar panels 26 via remote control. FIG. 2 illustrates the solar panels 26a–26d in the deployed condition arranged in a substantially common plane. The solar panels 26a–26d are connected to each other by a plurality of edge-mounted hinges 28 arranged along the length of the solar panels 26a–26d. The hinges are typically strain release-type hinges which carry substantially no load in the stowed condition of FIG. 1, and which spring open from the folded condition to assist in the unfolding of the solar panel arrays 22. Solar cells (not shown) are provided on the top faces 30 of the solar panels 26a–26d to collect light and convert it to electrical power for use by the satellite.

Figure 3:
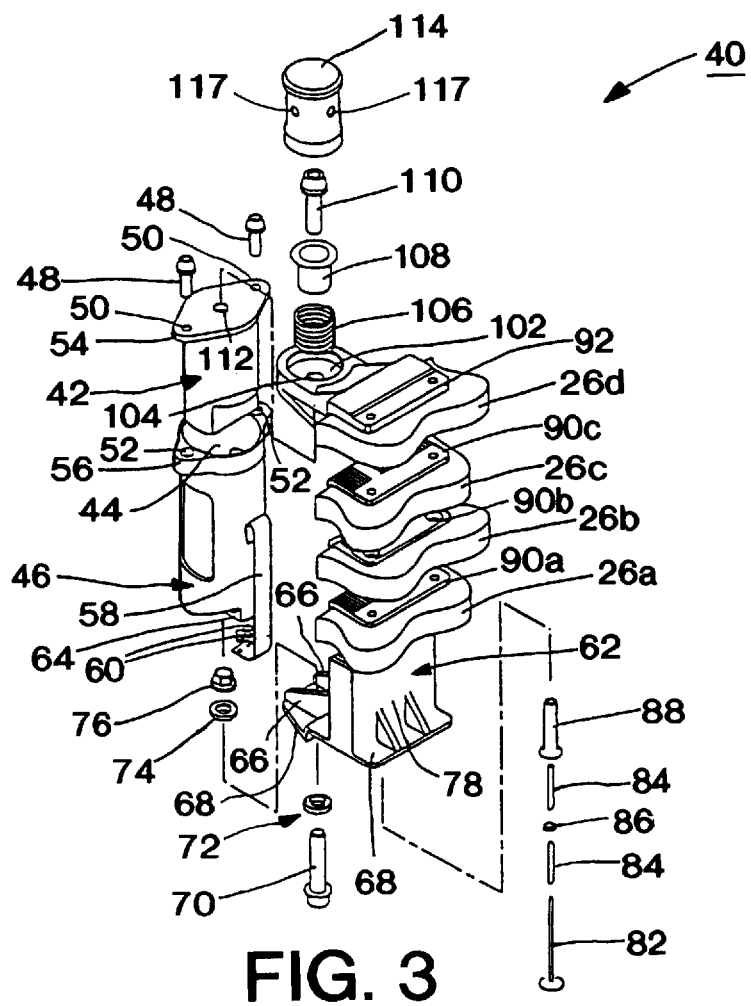
FIG. 3 is an exploded perspective view of the (RRDI) device according to the invention showing the solar panels cut-away.

FIG. 3 is an exploded view of the RRDI device 40 showing the individual solar panels 26a–26d of a typical solar panel array 22 cut-away for clarity. The RRDI device 40 comprises interconnected mechanisms to provide all three of the three functions of restraint, release and initiation of deployment in an integrated, compact unit.

The RRDI device 40 comprises a separation nut assembly 42 which is received in a bore 44 of a separation nut housing 46. The separation nut assembly 42 is an electro-mechanical device. An exemplary separation nut assembly 42 for use in the RRDI device 40 is a Model 9421-2 Non-Explosive Separation Nut, available from G & H Technology, Inc. of Camarillo, Calif. Other like non-explosive actuated (NEA) separation nut assemblies can optionally be used. The separation nut assembly 42 has low shock, rapid release capabilities.

The separation nut assembly 42 is fastened to the separation nut housing 46 by fasteners 48 which extend through holes 50 formed in a flange 54 of the separation nut assembly 42 and through holes 52 formed in a flange 56 of the separation nut housing 46.

A spring element 58 is mounted on the separation nut housing 46 using conventional fasteners 60. The spring element 58 is provided to urge the solar panel array 22 away from the satellite 20 if lateral movement of the solar panel array 22 occurs following release of the separation nut assembly 42.

Figure 8:
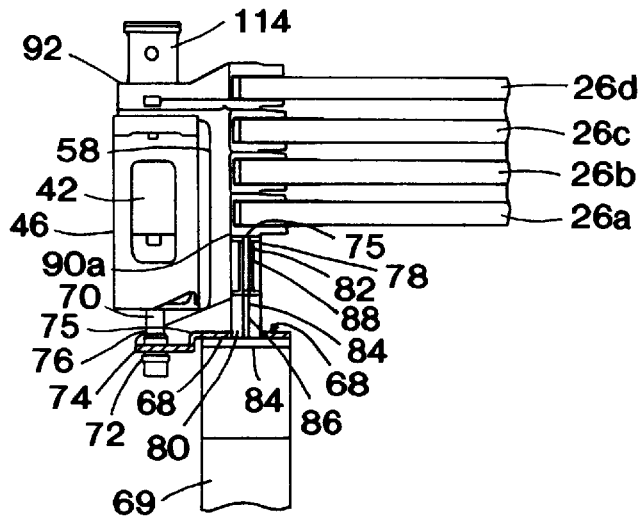
FIG. 8 is a partial cross-section of the RRDI device of FIG. 4 showing the deployment initiation mechanism.

The separation nut housing 46 and the separation nut assembly 42 are mounted on a base 62. The separation nut housing 46 comprises a lower portion 64 which is fitted between a pair of walls 66 formed on a flange 68 of the base 62. Referring to FIG. 8, the flange 68 is typically fastened to a bracket 69 on the satellite 20. The location of a plurality of the brackets 69 at the corners of the satellite 20 is shown in FIG. 1. The flange 68 can optionally be fastened directly to the satellite 20 without using such a bracket 69.

An adjustment bolt 70 extends upwardly through the flange 68 and is threaded into the separation nut housing 46 to secure the base 62 to the separation nut housing 46. The adjustment bolt 70 can be tightened or loosened to adjust the compressive pre-load force applied to the stowed solar panel array 22. The adjustable pre-load enables the RRDI device 40 to be used with solar panel arrays 22 having a range of sizes and weights and requiring different pre-loads for secure restraint to the support structure.

A spherical washer set 72 is fitted on the adjustment bolt 68 below the flange 68 and a spherical washer set 74 is fitted on the adjustment bolt 70 above the base 62. The spherical washer sets 72, 74 enable the adjustment bolt 70 to be adjusted to correct for tilt misalignment of the solar panel arrays 22. A locking nut 76 is provided on the adjustment bolt 70 to secure the spherical washer sets 72, 74 in the adjusted position once tilt adjustment is completed. FIG. 8 shows the spherical washer sets 72, 74 and the locking nut 76 disposed on the adjustment bolt 70 in the stowed condition of the solar panels 26.

The RRDI device 40 comprises a mechanism for initiating deployment of the solar panel array 20 in response to actuation of the separation nut assembly 42. As illustrated in FIG. 8, the base 62 comprises an upstanding portion 78 which defines a cavity 80. In the illustrated stowed condition of the solar panels 26a–26d, a spring guide 82, and a pair of compression springs 84, a spacer 86 and a contact element 88 disposed on the spring guide 82, are housed within the cavity 80. The compression springs 84 are compressed prior to deployment of the solar panels 26a–26d. A bracket 90a provided on the solar panel 26a contacts the contact element 88 and the compression springs 84 are in the compressed condition. The spring guide 82, compression springs 84 and contact element 88 assist in the initiation of deployment of the solar panels 26a–26d by applying a push-off force directly to the solar panel 26a on the upstanding portion 78 of base 62. The spring guide 82 prevents the contact element 88 from tipping off and also prevents the compression springs 84 from buckling. In the deployed condition shown in FIGS. 6 and 7, the compression springs 84 are expanded (not shown) and the contact element 88 protrudes upwardly through an opening 85 at the top of the upstanding portion 78 of the base 62. The opening 85 is in communication with the cavity 80.

The number of compression springs 84 provided on the spring guide 82 can be varied. In addition, other types of resilient biasing elements than compression springs can optionally be used to provide the kick-off force to the solar panels 26a–26d.

A lock wire 75 is preferably wrapped around the spring element 58 and the base 62 to resist rotation of the separation nut housing 46 during the release and deployment of the solar panel array 22.

Figure 4:
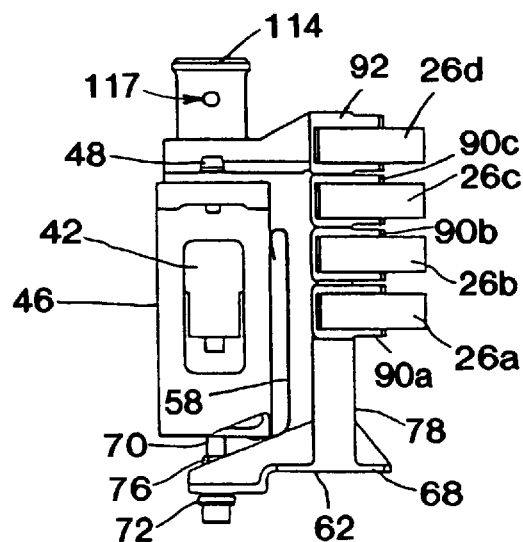
FIG. 4 is a side elevation view of the RRDI device of FIG. 3 in the restrained condition.
Figure 5:
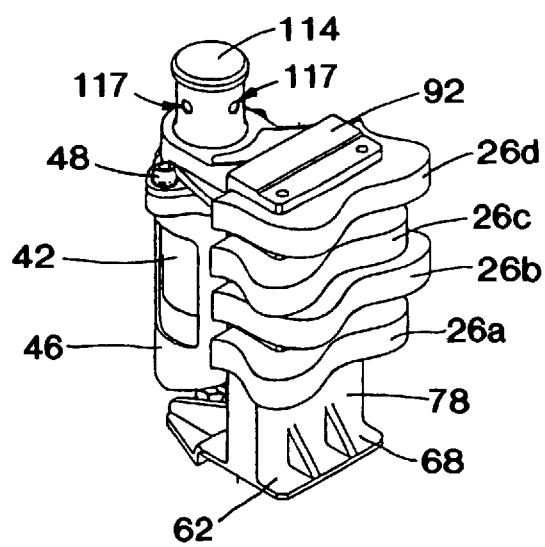
FIG. 5 is a perspective view of the RRDI device of FIG. 4.
Figure 7:
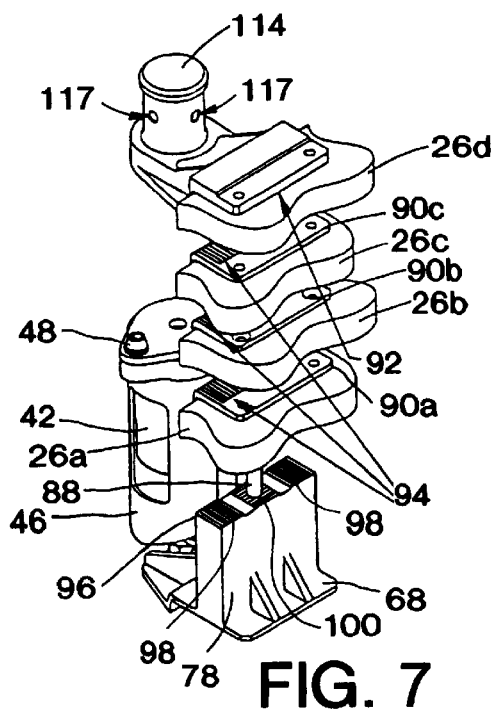
FIG. 7 is a perspective view of the RRDI device of FIG. 6.

Referring to FIGS. 4, 5 and 7, the stowed solar panels 26 are supported on the upstanding portion 78 of the base 62 in the stowed condition. A generally U-shaped bracket 90a, 90b, 90c is fastened to the solar panels 26a, 26b, 26c, respectively, and an upper bracket 92 is fastened to the upper solar panel 26d. The brackets 90a–90c each have serrated surface regions 94 (only one region 94 is shown) formed on opposite sides of the brackets 90a–90c (only one side is shown). The serrated regions 94 have mating patterns to those of the serrated regions 96 formed on the upstanding portion 78 of the base 62 and the serrated regions formed on the bottom face (not shown) of the upper bracket 92. The serrated regions 96 on the base 62 include serrations 98 parallel to each other and serrations 100 approximately perpendicular to the serrations 98. The serrated plates 90a, 90b and 90c are identical. The serrations are cut such that the "top" serrations are shifted by ½ of a tooth spacing to the "bottom" serrations. This way they are merely stacked top-to-bottom to accomplish the locking effect. This engagement is partially depicted at 101 in FIG. 9.

Figure 9:
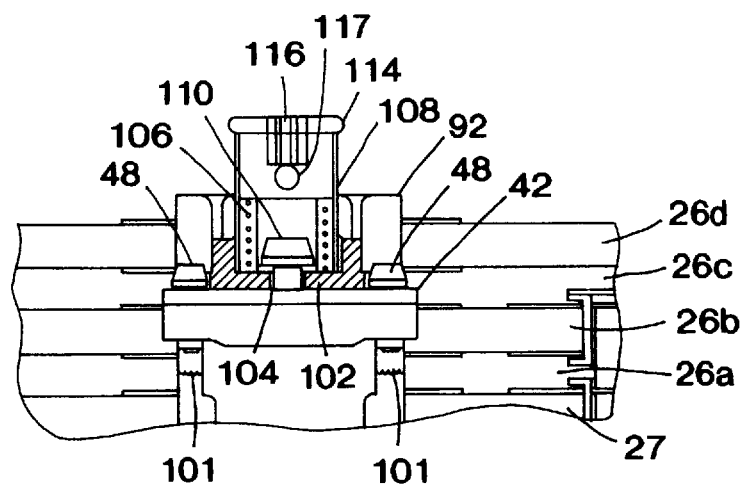
FIG. 9 is an enlarged partial cross-section showing the separation bolt release assist mechanism of the RRDI device.

Referring to FIGS. 3 and 9, the RRDI device 40 further comprises a mechanism to assist in release of the separation bolt 110 from the separation nut assembly 42. The top bracket 92 has a bore 102 and a central opening 104 in communication with the bore 102. A coil spring 106 is disposed within the bore 102 and a spring ferrule 108 is partially received within the spring 106. The separation bolt 110 is received within the spring 106 and extends through the central opening 104 and through a hole 112 formed in the flange 54 of the separation nut assembly 42 to fasten the top bracket 92 to the separation nut assembly 42 in the stowed condition. Once the separation nut assembly 42 is actuated, the spring 106 and the spring ferrule 108 pull the separation bolt 110 from the separation nut assembly 42 to ensure release of the stowed solar panels 26a–26d. Other resilient biasing mechanisms such as different types of springs can optionally be used for this function.

A separation bolt catcher 114 is partially received in the bore 102. Crushable material 116 is located interiorly at the top of the separation bolt catcher 114 to absorb the released separation bolt 110 energy and to slow the separation bolt 110, so as to reduce the possibility that the separation bolt 110 bounces back and interferes with deployment of the solar panels 26a–26d. The crushable material 116 is preferably aluminum having a honeycomb structure. The separation bolt catcher 114 has holes 117 drilled through the catcher body which allow for ease of bolt catcher 114 installation (by placing a rod through the holes and turning) and the holes allow for visual inspection of the crushable material 116 and the top of the spring ferrule 108.

In the restrained position illustrated in FIGS. 4 and 5, the RRDI device 40 substantially prevents the solar panels 26a–26d from moving relative to the satellite. This restraint is provided by the compressive pre-load applied to the solar panels 26a–26d. This compressive load acts approximately perpendicular to the major faces 30 of the solar panels 26a–26d through the interlocked serrated brackets 90a–90c, 92 attached to the solar panels 26a–26d. The pre-load also substantially prevents the solar panels 26a–26d from moving laterally with respect to each other, thereby substantially eliminating solar array damage. The pre-load force applied to the solar panel array 22 is set by selectively rotating the adjustment bolt 70. Any tilt misalignment of the solar panel array 22 is corrected by the spherical washer sets 72, 74 to ensure proper orientation of the solar panel array 22 relative to the satellite 20.

The separation nut assembly 42 is remotely actuated by a command signal to release the separation bolt 110. Release of the separation bolt 110 is an irreversible action, in that the bolt physically, permanently separates from the separation nut assembly 42. In applications in which a plurality of RRDI devices 40 are used on the restrained mechanism, such as the solar panel arrays 22 shown in FIGS. 1 and 2, the separation nut assembly 42 of the individual RRDI devices 40 are typically actuated at short time intervals. For example, the separation nut assemblies 42 may be actuated at intervals as short as only about 10–20 ms such that the total release time for the four RRDI devices 40 is only about 40–80 ms and, thus, is substantially simultaneous. Accordingly, the release of the solar panel array 22 can be completed in a much shorter time period than can be accomplished using thermal knife-type actuating mechanisms.

Figure 6:
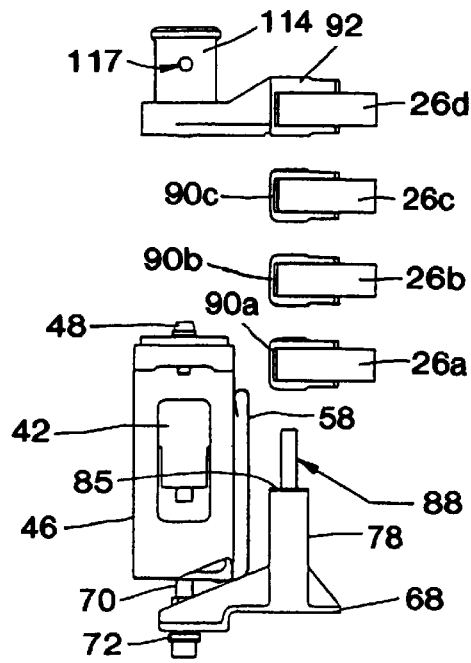
FIG. 6 is a side illustration view of the RRDI device of FIG. 3 in the released condition.

Once the separation bolt 110 is released, the compressive spring 106 expands causing the separation bolt 110 to be pulled from the separation nut assembly 42. A deployment initiation kick-off force is applied directly to the released solar panel array 22 by the spring guide 82, springs 84 and contact element 88, urging the solar panels 26a–26d upwardly away from the base 62 as depicted in FIGS. 6 and 7 and directly away from the satellite 20 to enable the solar panels 26a–26d to unfold to the deployed condition shown in FIG. 2. Any lateral movement of the solar panel array 22 during this deployment is resisted by the spring element 58 which pushes the solar panel array 22 away from the separation nut housing 46.

Thus, the RRDI device 40 according to the invention provides a number of important advantages. More specifically, the RRDI device securely restrains the deployable mechanism to the support structure from spacecraft stowage, through launch, and to release from the spacecraft boost vehicle. The restraining mechanism provides a high pre-load and pre-load adjustability, as well as tilt misalignment adjustment. The non-explosive actuated release mechanism provides rapid, low-shock release of the restrained mechanism, resulting in reliable deployment of the mechanism. This low-shock release is especially important in the deployment of sensitive, solar panel arrays. The RRDI device 40 also provides reliable assistance in deployment initiation of the mechanism from the restrained position on the spacecraft. The simple, compact construction of the RRDI device 40 makes it easy to manufacture and test. In addition, the elements of the RRDI device 40 are preferably formed of lightweight materials such as aluminum, titanium and composites to provide a lightweight construction.

Although the RRDI device 40 is particularly suitable for use with solar panel arrays on a satellite, the RRDI device 40 can also be used in other space and non-space related applications. More specifically, the RRDI device 40 has utility in various other applications that require one-time release and deployment initiation of a deployable mechanism from a support structure. The RRDI device 40 can be used for the deployment of other like mechanisms on other types of spacecrafts, as well as for deploying various mechanisms and structures in land-based and sea-based applications.

The present invention has been described in considerable detail with reference to certain preferred versions thereof, however, other versions are possible. Therefore, the spirit and scope of the appended claims should not be limited to the description of the preferred versions contained herein.

What is claimed is:

1. An integrated device for the restraint, release and deployment initiation of a deployable mechanism mounted on a support structure, the mechanism being operable between a stowed condition and a deployed condition, the device comprising:

a) a base for mounting the device to the support structure, the base supporting the mechanism in the stowed condition;

b) releasable restraining means connected in fixed relation to the base in the stowed condition for applying restraining force to the stowed mechanism to substantially prevent movement of the mechanism relative to the support structure;

c) non-explosive actuated releasing means connected to the restraining means for rapidly releasing the restraining force applied to the stowed mechanism; and d) deployment initiation means fixed to the base in a compressed state in the stowed condition and remaining fixed to the base in an expanded state in the deployed condition of the mechanism for applying a push off force to the mechanism in response to actuation of the releasing means thereby urging the mechanism to the deployed condition away from the support structure.

2. The device of claim 1, wherein the deployable mechanism is selected from the group consisting of solar panel arrays, antennas, booms and support members.

3. The device of claim 1, wherein the support structure is a space-based structure.

4. The device of claim 3, wherein the space-based structure is a satellite.

5. An integrated device for the restraint, release and deployment initiation of a deployable solar panel array mounted on a space-based support structure, the solar panel array being operable between a stowed condition and an unfolded condition, the device comprising:

a) a base for mounting the device to the support structure, the base supporting the solar panel array in the stowed condition;

b) releasable restraining means connected in fixed relation to the base in the stowed condition for applying restraining force to the stowed solar panel array to substantially prevent lateral movement of the solar panels relative to each other and to substantially prevent movement of the stowed solar panel array relative to the support structure;

c) non-explosive actuated releasing means connected to the restraining means for rapidly releasing the restraining force applied to the stowed solar panel array; and d) deployment initiation means for applying a biasing force to the solar panel array in response to actuation of the releasing means thereby urging the stowed solar panel array to the unfolded condition away from the support structure, wherein the restraining means is separated from fixed relation to the base from the stowed to the unfolded condition, and wherein such separation is irreversible.

6. The device of claim 5, wherein the restraining means comprises a plurality of brackets, each of which is attached to one of the solar panels of the solar panel array, the base having a serrated surface which supports the solar panel array in the stowed condition, the brackets each having a serrated surface on at least one of opposite faces of the brackets, the serrated surface on the base interlocking with the serrated surface of a panel and the serrated surfaces of adjacent solar panels interlocking with each other in the stowed condition to substantially prevent lateral movement of the solar panels relative to each other.

7. The device of claim 6, wherein the restraining means further comprises adjustment means for applying an adjustable compressive pre-load to the stowed solar panel array, the pre-load acting through the interlocked brackets to substantially prevent lateral movement of the solar panels relative to each other and to substantially prevent movement of the stowed solar panel array relative to the support structure.

8. The device of claim 7, wherein the adjustment means comprises a fastener fastened to the base and to the releasing means, the fastener being selectively adjustable to vary the pre-load applied to the stowed solar panel array.

9. The device of claim 8, wherein the adjustment means further comprises tilt adjustment means for correcting tilt misalignment of the stowed solar panel array relative to the support structure.

10. The device of claim 5, wherein the base has a cavity and an opening in communication with the cavity, the deployment initiation means comprises a first spring biased element received in the cavity prior to actuation of the releasing means, a portion of the first spring biased element protruding through the opening so as to contact and urge the solar panel array to the unfolded condition away from the support structure in response to actuation of the releasing means.

11. The device of claim 10, wherein the first spring biased element comprises a spring guide, and at least one coil spring and a contact element disposed on the spring guide, the spring guide, the coil spring and the contact element being housed in the cavity in the stowed condition, the contact element protruding through the opening so as to contact and urge the solar panel array to the unfolded condition away from the support structure in response to actuation of the releasing means.

12. The device of claim 5, wherein the releasing means comprises a non-explosive separation nut assembly including a releasable separation bolt, the device further comprising assist means for assisting in the release of the separation bolt from the separation nut assembly in response to actuation of the separation nut assembly.

13. The device of claim 12, wherein the assist means comprises a second spring biased element which asserts a force on the separation bolt to urge the separation bolt from the separation nut assembly in response to actuation of the separation nut assembly.

14. The device of claim 13, further comprising means provided on the restraining means for catching the separation bolt subsequent to separation from the separation nut assembly.

15. The device of claim 5, further comprising a resilient member mounted on the releasing means for urging the solar panel array away from the support structure subsequent to the release of the restraining force.

16. An integrated device for the restraint, release and deployment initiation of a solar panel array mounted on a support structure, the solar panel array being operable between a stowed condition and a deployed condition, the device comprising:

a) a base for mounting the device to the support structure, the base having a support surface for supporting the solar panel array in the stowed condition;

b) a plurality of brackets, each of which is attached to one of the solar panels of the solar panel array, the brackets interlocking with each other in the stowed condition;

c) a non-explosive, rapidly actuated release mechanism including a separation bolt, the separation bolt being connected to one of the brackets in the stowed condition;

d) an adjustment bolt fastened to the release mechanism for adjusting a compressive pre-load applied to the stowed solar panel array through the brackets, the pre-load substantially preventing lateral movement of the interlocked solar panels of the solar panel array relative to each other and substantially preventing movement of the solar panel array relative to the support structure; and e) a first resilient biasing mechanism provided on the base for applying a biasing force to the solar panel array in response to actuation of the release mechanism thereby urging the solar panel array to the deployed condition away from the support structure.

17. The device of claim 16, further comprising a second resilient biasing mechanism provided on one of the brackets for urging the separation bolt from the release mechanism in response to actuation of the release mechanism.

18. The device of claim 16, further comprising a pair of spherical washer sets on the adjustment bolt for correcting tilt misalignment of the stowed solar panel array.

19. The device of claim 16, wherein the support surface of the base is serrated, the brackets each having a serrated surface on at least one of opposite faces of the brackets, the serrated support surface on the base interlocking with the serrated surface of one of the brackets and the serrated surfaces of the brackets attached to adjacent solar panels interlocking with each other in the stowed condition to substantially prevent lateral movement of the solar panels relative to each other.

20. In combination:

a) a deployable mechanism for mounting on a support structure, the mechanism being operable between a stowed condition and a deployed condition; and b) at least one integrated device for the restraint, release and deployment initiation of the mechanism, the device comprising:

i) a base for mounting the device to the support structure, the base supporting the mechanism in the stowed condition;

ii) a releasable restraining means connected in fixed relation to the base in the stowed condition for applying restraining force to the stowed mechanism to substantially prevent movement of the stowed mechanism relative to the support structure;

iii) non-explosive actuated releasing means connected to the restraining means for rapidly releasing the restraining force applied to the stowed mechanism; and iv) deployment initiation means for applying a biasing force to the mechanism in response to actuation of the releasing means thereby urging the stowed mechanism to the deployed condition away from the support structure wherein the restraining means is separated from fixed relation to the base from the stowed to the deployed condition, and wherein such separation is irreversible.

21. The combination of claim 20, wherein the deployable mechanism is selected from the group consisting of solar panel arrays, antennas, booms and support members.

22. The combination of claim 20, wherein the support structure is a space-based structure.

23. The combination of claim 22, wherein the space-based structure is a satellite.

24. The combination of claim 20, wherein the deployable mechanism is a solar panel array and the support structure is a satellite, a plurality of the devices being located about the perimeter of the solar panel array.

25. The combination of claim 24, wherein the releasing means of the devices are substantially simultaneously actuated.

26. The combination of claim 24, wherein the restraining means of the devices substantially prevent lateral movement of the solar panels of the stowed solar panel array relative to each other.

27. The combination of claim 26, wherein the solar panels of the solar panel array are connected to each other by strain release hinges, the hinges being in a folded condition in the stowed condition of the solar panel array, and the hinges unfolding so as to urge the deployment of the solar panels in response to actuation of the releasing means.

28. An integrated device for the restraint, release and deployment initiation of a deployable mechanism mounted on a support structure, the mechanism being operable between a stowed condition and a deployed condition, the device comprising:

a) a base for mounting the device to the support structure, the base supporting the mechanism in the stowed condition;

b) restraining means connected in fixed relation to the base in the stowed condition for applying restraining force to the stowed mechanism to substantially prevent movement of the mechanism relative to the support structure;

c) releasing means connected to the restraining means for releasing the restraining force applied to the stowed mechanism; and d) deployment initiation means for applying a biasing force to the mechanism in response to actuation of the releasing means thereby urging the mechanism to the deployed condition away from the support structure, wherein the restraining means is separated from fixed relation to the base from the stowed to the deployed condition, and wherein such separation is irreversible.

29. The device of claim 28, wherein the deployment initiation means is fixed to the base in a compressed state in the stowed condition and remains fixed to the base in an expanded state in the deployed condition of the mechanism.

30. An integrated device for the restraint, release and deployment initiation of a deployable mechanism mounted on a support structure, the mechanism being operable between a stowed condition and a deployed condition, the device comprising:

a) a base for mounting to the support structure, the base supporting the deployable mechanism in a fixed relation in the stowed condition;

b) a restraint disposed to apply a restraining force to the stowed mechanism to substantially prevent movement of the stowed mechanism relative to the base and to the support structure;

c) a release connected to the restraint for releasing the restraining force applied to the stowed mechanism; and d) a deployment initiator fixedly disposed at the base for applying a biasing force to the mechanism in response to actuation of the release so as to urge the mechanism to the deployed condition away from the support structure, wherein the mechanism is released from said fixed relation to the base from the stowed to the deployed condition, and wherein such release from said fixed relation is irreversible.

* * * * *